United States Patent [19]

Matsui et al.

[11] Patent Number: 5,296,980
[45] Date of Patent: Mar. 22, 1994

[54] MAGNETIC DISK APPARATUS HAVING RECORDING HEADS FOR OPPOSITE DISK SURFACES WHICH ARE OFFSET FROM EACH OTHER

[75] Inventors: Takao Matsui, Yamato; Yoshiaki Sonobe, Fujisawa, both of Japan

[73] Assignee: International Business Machines Corporation, Armonk, N.Y.

[21] Appl. No.: 93,294

[22] Filed: Jul. 16, 1993

Related U.S. Application Data

[63] Continuation of Ser. No. 705,837, May 28, 1991, abandoned.

[30] Foreign Application Priority Data

May 28, 1990 [JP] Japan ................. 2-135506

[51] Int. Cl.⁵ .................. G11B 5/48; G11B 17/02
[52] U.S. Cl. ................. 360/97.01
[58] Field of Search .......... 360/97.01, 98.01, 103, 360/106, 104, 105

[56] References Cited

U.S. PATENT DOCUMENTS

| | | | |
|---|---|---|---|
| 3,789,156 | 1/1974 | Bessette | 360/124 |
| 4,729,048 | 3/1988 | Imakoshi et al. | 360/121 |
| 4,803,578 | 2/1989 | Fujiwara et al. | 360/103 |
| 4,807,054 | 2/1989 | Sorensen et al. | 360/104 |
| 4,811,140 | 3/1989 | Enami et al. | 360/103 |
| 4,912,582 | 3/1990 | Gomi et al. | 360/99.01 |
| 4,937,693 | 6/1990 | Connolly et al. | 360/106 |
| 4,974,106 | 11/1990 | White et al. | 360/103 |
| 5,060,100 | 10/1991 | Mihara et al. | 360/108 |

*Primary Examiner*—Robert S. Tupper
*Attorney, Agent, or Firm*—Richard E. Billion; Roy W. Truelson

[57] ABSTRACT

Disclosed is a disk drive having at least one disk. An actuator arm carriers at least two sliders which are positioned over the first and second surface of the disk. The actuator arm moves the sliders to various selected positions over disks so that representations of data can be read from or written into the tracks of the disk. Each slider includes at least one magnetic transducer or magnetic head. The magnetic head is actually passed over the track in the disk during a read or write operation. The heads are shifted slightly with respect to a line perpendicular to the disk surface to minimize or reduce crosstalk and electromagnetic coupling between the heads located on the first and second surface of the disk. In other words, the heads are intentionally misaligned to increase the distance between the two heads and to reduce crosstalk and electromagnetic coupling between the two heads.

7 Claims, 2 Drawing Sheets

| AMOUNT OF MEASUREMENT | AMOUNT OF ATTENUATION | AMOUNT OF CROSSTALK |
|---|---|---|
| PRIOR ART | -1.73dB | -46.4dB |
| PRESENT INVENTION | -0.29dB | -54.6dB | ated May 28, 1991, now abandoned.

MAGNETIC DISK APPARATUS HAVING RECORDING HEADS FOR OPPOSITE DISK SURFACES WHICH ARE OFFSET FROM EACH OTHER

This application is a continuation of application Ser. No. 07/705,837 filed May 28, 1991, now abandoned.

FIELD OF THE INVENTION

The invention relates to a magnetic disk apparatus using glass or ceramics as a substrate, especially the magnetic disk apparatus with sharply reduced crosstalk between two magnetic heads.

BACKGROUND OF THE INVENTION

Heretofore, the magnetic disk apparatus using aluminum as its disk substrate has been generally used. But recently, in the field of hard disk apparatus, capacity expansion and miniaturization is desired. As a method of capacity expansion, glass or ceramics are conceived to be used as the disk substrate. Such disk substrate, by its excellent surface characteristics and the like, make it easy to attain the low floatation of the head, thereby increasing the recording density.

However, the conventional magnetic disk apparatus with aluminum substrate can shield the electromagnetic coupling of a pair of top and bottom magnetic heads, which exist on each sides of the magnetic disk, but the magnetic disk apparatus with a glass or ceramic substrate cannot shield the aforesaid electromagnetic coupling of the upper and lower magnetic heads, thereby causing the crosstalk noise to increase, and the reproduced signal to deteriorate. For example, when the lower head records a 4 MHz signal while the upper head reproduces it, the measured crosstalk (at the 4 MHz output level) for the glass substrate disk 1.27 mm thick is greater than the crosstalk for the aluminum substrate disk. The crosstalk of the glass substrate disk is +8.9 dB higher than that of the aluminum substrate disk. Also, when the attenuation ratio of reproduced signal is defined as $f'_{4M}/f_{4M}$, and the ratio of crosstalk as $f'_{1.5M}/f'_{4M}$, and $f_{4M}$, $f'_{4M}$, and $f'_{1.5M}$ for glass substrate disk are measured, the ratios for the glass disk are $-1.73$ dB and $-46.4$ dB, respectively. When $f_{4M}$, $f'_{4M}$, and $f'_{1.5M}$ for aluminum substrate disk are measured, the attenuation ratio of reproduced signal, $f'_{4M}/f_{4M}$, is $-0.38$ dB and the ratio of crosstalk $f'_{1.5M}/f_{4M}$ is $-60.6$ dB. It is clear from the above-mentioned features, that the glass substrate disk, when compared with the aluminum substrate disk, has considerably greater ratios of attenuation and of crosstalk. Where the $f_{4M}$=reproduced signal level by the top head at 4 MHz before recorded by the bottom head, $f'_{4M}$=reproduced signal level at 4 MHz by the bottom head after recorded by bottom head, and $f'_{1.5M}$=reproduced signal level at 1.5 MHz by the top head after recorded by the bottom head.

The magnetic characteristics of the recording layer of the magnetic disk being used in the experiment are:

$$Hc = 1 \times 10^3 Oe, M \, r \, t \approx 4.2 \times 10^{-3} \, emu/cm^2$$

for aluminum substrate disk, and $$Hc \approx 1.25 \times 10^3 \, Oe, M \, r \, t \, 4.0 \times 10^{-3} \, emu/cm^2$$

for the glass substrate disk.

The magnetic head used has a gap length of 0.6 μm, the track width of Tw≈10 μm. In this case, the floating amount of the magnetic head is 8 μ. As shown above, a conventional magnetic disk apparatus using an aluminum substrate disk causes only a slight crosstalk noise problem because aluminum substrate disk can shield the electromagnetic coupling of the top and bottom magnetic heads.

However, the magnetic disk apparatus with a glass substrate disk cannot shield the electromagnetic coupling of the top and bottom magnetic heads as mentioned above, thus the crosstalk noise becomes a serious problem.

The aforementioned conventional magnetic disk apparatus with the glass substrate disk has a problem of serious crosstalk noise caused by the electromagnetic coupling of the top and bottom magnetic heads across the disk. Therefore, there is a need for an apparatus and method for reducing the crosstalk on a disk with a glass or similar substrate.

SUMMARY OF THE INVENTION

This invention is, to reduce the above mentioned electromagnetic crosstalk, to provide a magnetic disk apparatus with reduced crosstalk noise and reduced attenuation of output signal, not by forming a shield layer, but by shifting the position of the top and bottom magnetic heads.

The magnetic disk apparatus concerning this invention arranges to shift the position of its magnetic heads, which are sandwiched between the magnetic disk surfaces.

This invention, by shifting the position of a pair of magnetic heads, which are sandwiched between the magnetic disk, reduces the crosstalk noise and the attenuation of the output signal.

DETAILED DESCRIPTION OF THE PREFERRED EMBODIMENT

Figures 1, 4:
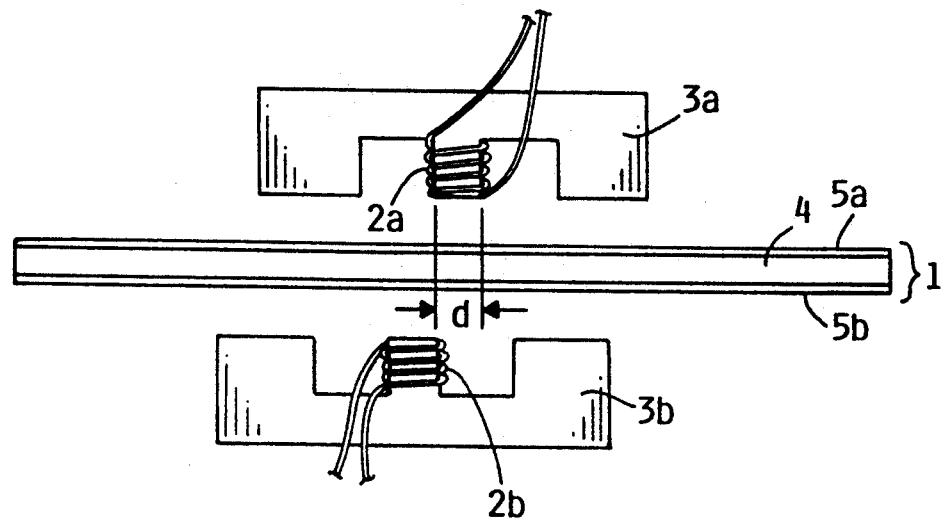
FIG. 1 shows the position relationship between the magnetic disk and the magnetic heads viewed from the direction of the rotation of the magnetic disk.
FIG. 4 is a table of values of the attenuation of the output signal and of the crosstalk, of the conventional technique and of the invention.
Figure 2:
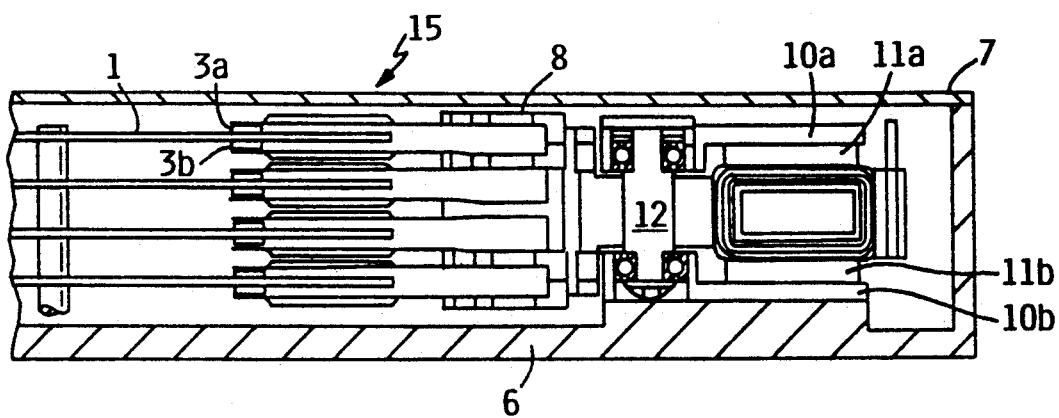
FIG. 2 is an overall view of the magnetic disk apparatus of the invention.
Figure 3:
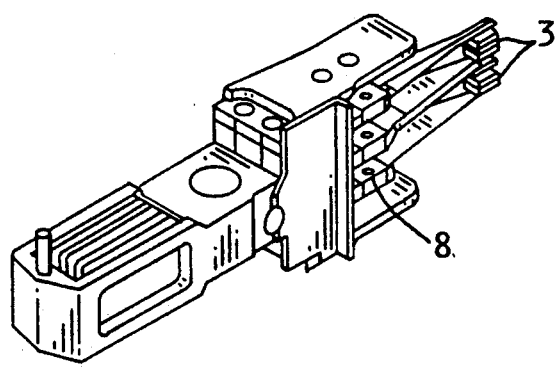
FIG. 3 shows a structure of the magnetic actuator.

FIG. 1 shows the positional relationship between the magnetic disk and the magnetic heads viewed from the direction of rotation of the magnetic disk according to one embodiment of the invention. FIG. 2 shows an overall view of the magnetic disk apparatus of the invention. FIG. 3 shows a structure of the magnetic actuator shown FIG. 2.

Before referring to the embodiment of FIG. 1, first refer to FIG. 2 and FIG. 3 to understand the overall structure of this magnetic disk apparatus. The magnetic disk apparatus 12 includes a base 6 and an upper cover 7. On the base 6, an actuator 8 is mounted by a shaft 12, and to the actuator 8, sliders 3a, 3b are mounted across the magnetic disk and on the top and bottom surfaces. On the opposite side of the actuator 8 and shaft 12, a coil 9 is fixed. Above the coil 9, at a fixed distance, an upper yoke 10a is mounted on the base 6. Below the coil 9, at a fixed distance, a lower yoke 10b is mounted on the base 6. On the upper yoke 10a and a lower yoke 10b, permanent magnets 11a, 11b are mounted on the side of the coil 9. The coil 9 and permanent magnets 11a, 11b form the voice coil motor, and the magnetic field of the permanent magnets 11a, 11b and the current flowing through the coil 9 causes the force to move the actuator 8. The direction to which the actuator moves is determined by the amount of current flowing through the coil 9.

Next referring FIG. 1, explain the embodiment of the invention. The substrate 4 of magnetic disk 1 is glass, and the magnetic layer 5a or 5b is deposited on the top and bottom sides of the substrate. On the top side of the magnetic disk 1, a first magnetic head 2a is arranged. The first magnetic head 2a is supported by a first slider 3a. Recording and reproduction of data on the top magnetic media surface of the magnetic disk 1 are done by flowing the driving current from the drive circuit (not shown in figure) to the coil of the first magnetic head 2a. Also, on the bottom of the magnetic disk 1, a second magnetic head 2b is arranged. The second magnetic head 2b is supported by a second slider 3b. The recording and reproduction of data on the bottom magnetic media surface of the magnetic disk 1 are done, in the same way as recording and reproduction of data on the top magnetic media surface, by flowing the driving current from the aforementioned drive circuit to the coil of the second magnetic head 2b.

Also, the first magnetic head 2a and the second magnetic head 2b are arranged to shift a recording track by length d. The magnetic heads are a monolithic head, incorporated into the sliders.

Firstly, in the FIG. 1, after the 4 MHz signal is recorded onto the top surface of the magnetic disk 1 by the first magnetic head 2a, the 1.5 MHz signal is recorded onto the bottom surface of the magnetic disk 1 by the second magnetic head 2b. Before and after recording by the second magnetic head 2b aforementioned $f_{4M}$ (Level of reproduced signal at 4 MHz by the first magnetic head 2a, before the recording by the second magnetic head 2b), $f'_{4M}$ (Level of reproduced signal at 4 MHz by the first magnetic head 2a, after the recording by the second magnetic head 2b on the bottom surface of the magnetic disk 1), $f'_{1.5M}$ (Level of reproduced signal at 1.5 MHz by the first magnetic head 2a, before the recording by the second magnetic head 2b on the bottom surface of the magnetic disk 1), are respectively measured to get the aforementioned attenuation and crosstalk ratios.

The obtained values of the aforementioned attenuation and of the crosstalk, for the conventional case of the first magnetic head and the second magnetic head on the same track(d=0), and for the first magnetic head and the second magnetic head shifted(d=10), are listed in table in FIG. 4.

As it is clear from FIG. 4, by shifting the positions of the first and the second magnetic heads by the fixed number of recording track, d, as shown in FIG. 1, the attenuation and the crosstalk of the reproduced signals are reduced sharply, from −1.73 dB to −0.29 dB, and from −46.4 dB to −54.6 dB, respectively. The thickness of the magnetic disk, the magnetic characteristic of recording layer of magnetic disk, and the characteristic of magnetic head, are similar to as mentioned before.

Of course, shifting the position of the magnetic gap in the direction of rotation of magnetic disk can also reduce the attenuation and the crosstalk of the reproduced signal as mentioned above. But the most effective way to reduce the attenuation and the crosstalk is by shifting the recording track of the first and the second magnetic heads.

Also, in the above mentioned embodiment, the monolithic head is used as the magnetic head, but use of the thin film head or the composite head would also take similar effects.

Furthermore, thinning the thickness of the substrate, reducing the cohesive force (HC) of magnetic media, and lowering the amount of the floating of magnetic head can also increase the effect of the invention.

EFFECT OF THE INVENTION

The invention, as explained above, sharply reduces the attenuation of the output signal and the crosstalk noise, and also reduces the cost of the apparatus, by shifting the position of top and bottom magnetic heads across magnetic disk without forming a shield layer on the disk substrate.

What is claimed is:

1. A magnetic disk apparatus comprising:
   at least one magnetic disk having an axis of rotation and a first and second surface, said disk comprising a rigid nonmagnetic substrate and at least one layer of magnetic material covering said first and second surfaces;
   a first magnetic head provided for a first surface of said magnetic disk; and
   a second magnetic head provided for a second surface of said magnetic disk;
   wherein the first and second magnetic heads are shifted with respect to each other a distance d in a direction radial to the axis of rotation of said disk, said first and second heads having a dimension in the direction of the shift, said distance d being less than the dimension of said heads in the direction of the shift.

2. The magnetic disk apparatus according to claim 1, wherein said disk has a non magnetic substrate of glass.

3. A magnetic disk apparatus according to claim 1, wherein said disk has a non magnetic substrate of ceramic.

4. A disk drive for storing representations of data, said disk drive comprising:
   a housing;
   at least one disk having an axis of rotation and a first surface and a second surface, said disk comprising a rigid nonmagnetic substrate and at least one layer of magnetic material covering said first and second surfaces, said disk rotatably mounted to the housing; and
   an actuator assembly rotatably mounted to said housing, said actuator assembly further including:
   at least two arms; and
   a slider attached to each of said arms, said slider including a head for reading representations of data from said disk and for writing representations of data to said disk, one slider positioned over said first surface of said at least one disk, another slider positioned over said second surface of said at least one disk so that the sliders pass the first and second surfaces of the disk, said sliders positioned so that the first head and the second head are shifted with respect to a line normal to said first and second surface of the disk in a direction radial to the axis of rotation of said disk, said sliders being positioned such that a line normal to one of the first or second surfaces of the disk will intersect the slider with the first head and the slider with the second head.

5. The disk drive of claim 4, wherein said rigid nonmagnetic substrate of said disk is one of the following materials: glass and ceramic.

6. A method for minimizing electromagnetic coupling and crosstalk between a first magnetic head and a second magnetic head in a disk drive including at least one rigid disk for storing representations of data on each of a first and second surface of the disk positioned to read or write data on the two surfaces of a disk, said magnetic heads attached to sliders, said method comprising the steps of:

positioning a first slider over the first surface of the disk;

positioning a second slider over the second surface of the disk, wherein said step of positioning a second slider positions said second slider shifted with respect to the first slider a distance d so that the magnetic heads within the sliders are misaligned with respect to a line perpendicular to one of the two surfaces of the disk, said first and second heads having a dimension in the direction of the shift, said distance d being less than the dimension of said heads in the direction of the shift; and fixing the relative position of said first and second sliders so that during operation of said disk drive, the relative position of said sliders remain constant.

7. The method of claim 6, wherein said first and second heads are shifted in a direction radial to said disk.

* * * * *